United States Patent [19]
Song et al.

[11] Patent Number: 5,347,461
[45] Date of Patent: Sep. 13, 1994

[54] TOOL TRAVEL PATH CREATING METHOD

[75] Inventors: Jin I. Song, Incheon; Moon Kang, Suwon, both of Rep. of Korea

[73] Assignee: Samsung Electronics Co., Ltd., Suwon, Rep. of Korea

[21] Appl. No.: 122,666

[22] Filed: Sep. 17, 1993

[30] Foreign Application Priority Data

Sep. 18, 1992 [KR] Rep. of Korea .................. 92-17063

[51] Int. Cl.$^5$ ............................................ G06F 15/46
[52] U.S. Cl. .......................... 364/474.29; 364/474.18; 364/474.33; 364/474.34
[58] Field of Search .................. 364/474.17, 474.18, 364/474.22–474.35, 138; 318/572, 573, 574, 568

[56] References Cited

U.S. PATENT DOCUMENTS

| | | | |
|---|---|---|---|
| 3,866,179 | 2/1975 | McGee et al. | 364/138 |
| 4,130,788 | 12/1978 | Fiegehen et al. | 318/574 |
| 4,162,527 | 7/1979 | Kilbane et al. | 364/474.18 |
| 4,533,286 | 8/1985 | Kishi et al. | 318/572 |
| 4,572,998 | 2/1986 | Nozawa et al. | 318/572 |
| 4,591,968 | 5/1986 | Nozawa et al. | 318/568 |
| 4,642,754 | 2/1987 | Kishi et al. | 318/568 |
| 4,659,265 | 4/1987 | Kishi et al. | 318/572 |
| 4,926,338 | 5/1990 | Nankaku | 364/474.32 |

FOREIGN PATENT DOCUMENTS 3-8002  1/1991  Japan .

*Primary Examiner*—Jerry Smith
*Assistant Examiner*—Jim Trammell
*Attorney, Agent, or Firm*—Burns, Doane, Swecker & Mathis

[57] ABSTRACT

A tool travel path creating method for a numerical control device comprises the steps of reading G-code program; determining whether or not any correction command is included in the read G-code program; determining whether or not the interior angle between a first vector, being a line segment from a start point of correction to a work starting point, and a second vector, being a line segment from the work starting point to an work ending point, is acute when a correction command is included in the read G-code program, and then creating a tool travel path to be corrected in accordance with the following steps: calculating and storing data for a third vector starting from the work starting point and with a direction perpendicular to the first vector and the same length as the radius of the tool; calculating and storing data for a fourth vector starting from the work starting point and formed by adding the second vector to an intermediary vector with the same direction as the second vector and the same length as the radius of the tool; a fifth vector starting from the work starting point and with a direction perpendicular to the second vector and the same length as the radius of the tool; and, calculating and storing data for a sixth vector starting from the work starting point and with the same direction as the first vector and a length of $2^{\frac{1}{2}}$ times the radius of the tool.

10 Claims, 6 Drawing Sheets

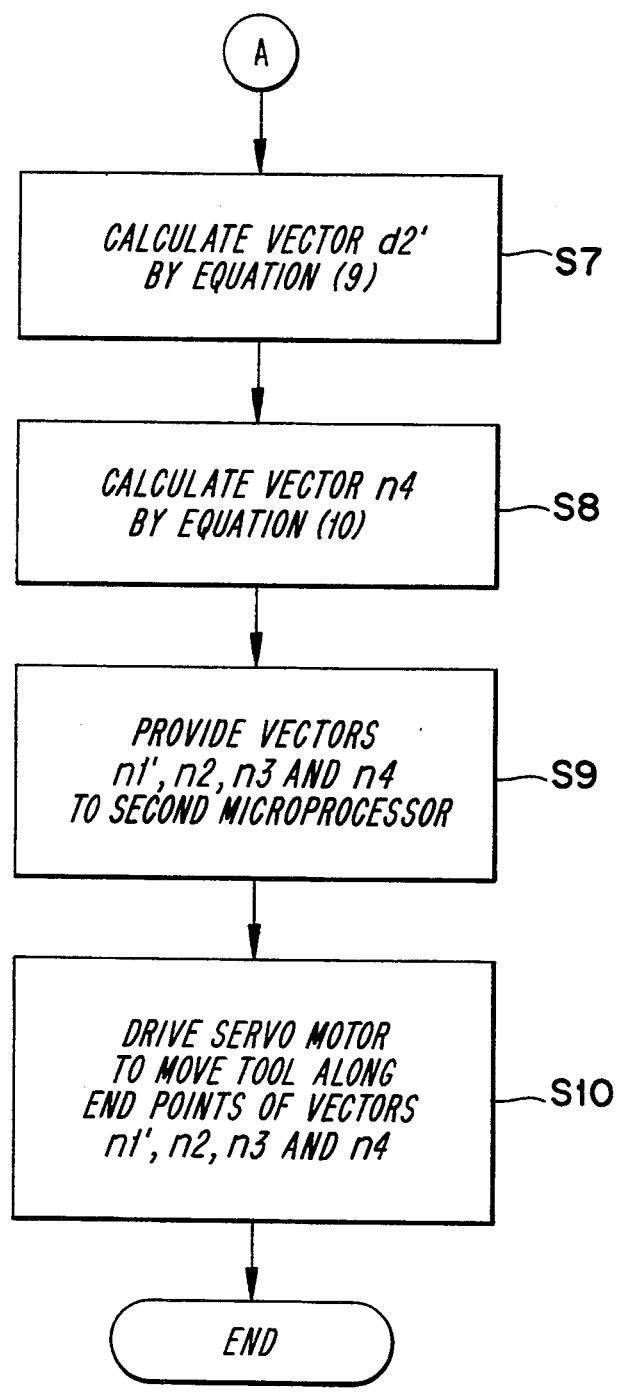

TOOL TRAVEL PATH CREATING METHOD

BACKGROUND OF THE INVENTION

1. Field of the Invention

The present invention is related to a method for creating a tool travel path on the basis of the size of the tool to be used to perform work on a workpiece by means of a computer numerical control device (hereinafter, called an "NC device").

2. Description of the Prior Art

When a workpiece is worked, for example cut, by an NC device, the path along which the tool is directed to travel must be changed according to the size of the tool.

FIG. 1 is a diagram showing the route of a tool center point corrected according to the diameter of the tool.

Referring to FIG. 1, reference numeral 1 denotes a tool used in the NC device, and reference numeral 4 denotes the workpiece to be worked by the tool 1.

In order to work the workpiece 4 with an NC device, for example, an NC milling machine, the machine operator must initially make an NC program for the tool by using the dimension of the workpiece itself to be worked, irrespective of the tool diameter. Next, the operator may preferably select a tool diameter correcting function, so that the center point of the tool 1 may travel along the desired path, shown by the dotted line, to work the workpiece in the shape denoted by the solid line in FIG. 1.

An NC program generally includes a plurality of unit commands (hereinafter, called a block) which the NC device will execute, for example, a rapid movement of the tool, the cutting of the workpiece, a tool path correction, etc. Each block is commonly separated from other blocks by a semicolon (;).

Additionally, there is a code system called a G-Code (Preparation Function) which is a language for plotting the NC program. Among the various G-Codes, the following are related to this disclosure;

G00: a command for rapidly moving the tool to a designated position;

G01: a command for making the tool move rectilinearly at a specified gradient or in parallel with a specified axis;

G17: a command for selecting a X-Y plane;

G40: a command for canceling a tool path correction command previously given in the NC program;

G41: a command for correcting the tool path in order to direct the tool to travel along the left side of the working surface of the workpiece with respect to the travelling direction (hereinafter, called a "left side correction");

G42: a command for correcting the tool path in order to direct the tool to travel along the right side of the working surface of the workpiece with respect to the travelling direction (hereinafter, called a "right side correction"); and, G90: a command for selecting an absolute coordinate system.

FIG. 2 is a diagram showing the travel path (dashed line) of a tool center point according to a left side correction, and FIG. 3 is a diagram showing the travel path of a tool center point according to the right side correction.

When either of the two tool travel path corrections described above is included in the NC program, the creation of the travel path to be corrected is executed simply by adding the radius of the tool to the programmed path.

Accordingly, a problem arises in that the tool cannot be exactly positioned at a desired work starting point, thereby causing the risk of under-cutting or over-cutting the workpiece. Such a problem becomes especially serious when the interior angle between the line segment from the starting point of correction to the work starting point and the line segment from the work starting point to the work ending point is acute.

On the other hand, a typical prior art for a tool diameter correcting method for a numerical controller is disclosed in Japanese patent laid-open publication No. 8002 (1991).

In particular, tool diameter correcting method, which prevents the correction from generating a deviation value after a specified code instruction is executed and which does not require a change in the instruction set value, is disclosed in the Japanese publication. However, a technique for solving the problem described above is not disclosed in the Japanese Publication.

SUMMARY OF THE INVENTION

It is an object of the present invention to provide a method for positioning a tool at a desired point when an interior angle, centered on the work starting point, between two line segments formed by connecting the starting point of correction, the work starting point and the work ending point is acute.

The tool travel path creating method of the present invention comprises the steps off reading the G-code program; determining whether or not any correction command is included in the G-code program; determining whether or not the interior angle between a first vector, being a line segment from the starting point of the correction to the work starting point, and a second vector, being a line segment from the work starting point to the work ending point, is acute when a correction command is included in the read G-code program, and then creating a tool travel path to be corrected in accordance with the following steps: calculating and storing data for a third vector starting from the work starting point and with a direction perpendicular to the first vector and the same length as the radius of the tool; calculating and storing data for a fourth vector starting from the work starting point and formed by adding the second vector to an intermediary vector with the same direction as the second vector and the same length as the radius of the tool; calculating and storing data for a fifth vector starting from the work starting point with a direction perpendicular to the second vector and the same length as the radius of the tool; and, calculating and storing data for a sixth vector starting from the work starting point with the same direction as the first vector and a length of $2^{\frac{1}{2}}$ times the radius of the tool.

In the method described above, when a right side correction is included in the G-code program, the directions of the third and sixth vectors are respectively obtained by rotating the first and second vectors by 90 degrees in a clockwise direction. On the other hand, when a left side correction is included in the G-code program, the directions of the third and sixth vectors are respectively obtained by rotating the first and second vectors by 90 degrees in a counter-clockwise direction.

BRIEF DESCRIPTION OF THE DRAWINGS

These and other aspects of the present invention are clarified by reference to the accompanying drawings in which.

DETAILED DESCRIPTION OF THE PREFERRED EMBODIMENT

Hereinafter, the preferred embodiment of the present invention will be described in detail with reference to the accompanying drawings.

Figure 6:
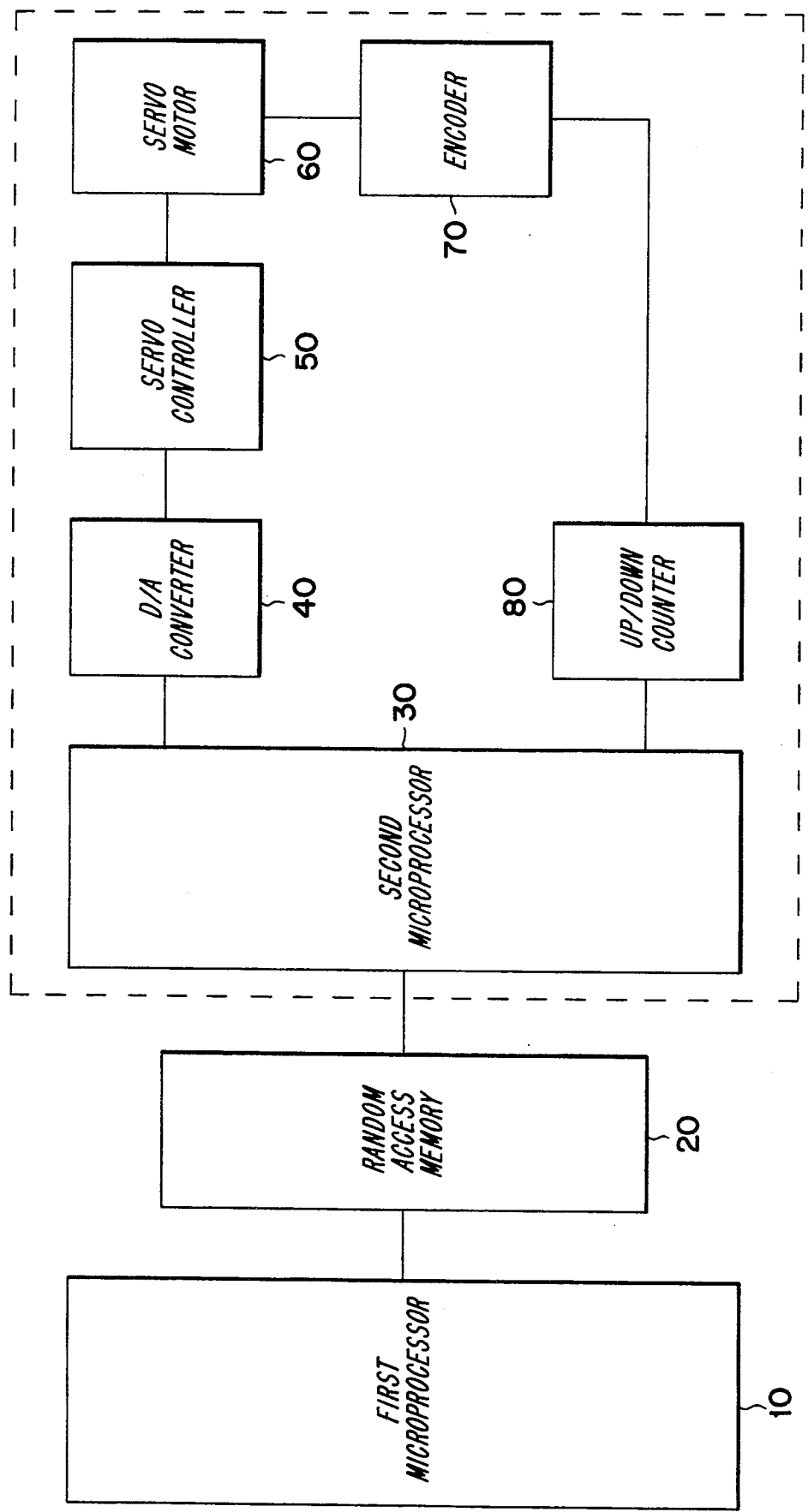
FIG. 6 is a block diagram of an apparatus in which the tool travel path creating method according to the present invention is embodied; and, FIG. 7a and 7b show a flow chart showing the control sequence of the tool travel path creating method according to the present invention.

Referring to FIG. 6, the apparatus, in which the present invention is embodied, comprises a servo motor 60 for moving a tool, a first microprocesor 10 for calculating the tool travel path to be created according to the tool diameter, a random access memory (RAM) 20 for storing data for the path calculated in the first microprocessor 10, a second microprocessor 30 for completely controlling the movement of the tool according to the travel path, a D/A convertor 40 for converting a digital speed control signal for the servo motor 60, transmitted from the second microprocessor 30, into a corresponding analog signal, a servo controller 50 for controlling the speed and direction of the servo motor 60 in accordance with the speed control signal from the D/A converter 40, an encoder 70 provided in the servo motor 60, and an up/down counter 80 for providing a signal made by counting, that is adding or subtracting, the number of the encoder pulses transmitted to the second microprocessor 30. The second microprocessor 30 calculates the rotation direction and speed of the servo motor 60 on the basis of the number of the encoder pulses from the up/down counter 80, and then executes the appropriate control.

For a better understanding of the creating method of the present invention, suppose that a G-code program is given as follows:

```
    .
    .
    .
G00 X200 Y200;
G90 G17 G41 D10 G00 X100 Y100;
G01 X300 Y100;
    .
    .
    .
```

Figure 1:
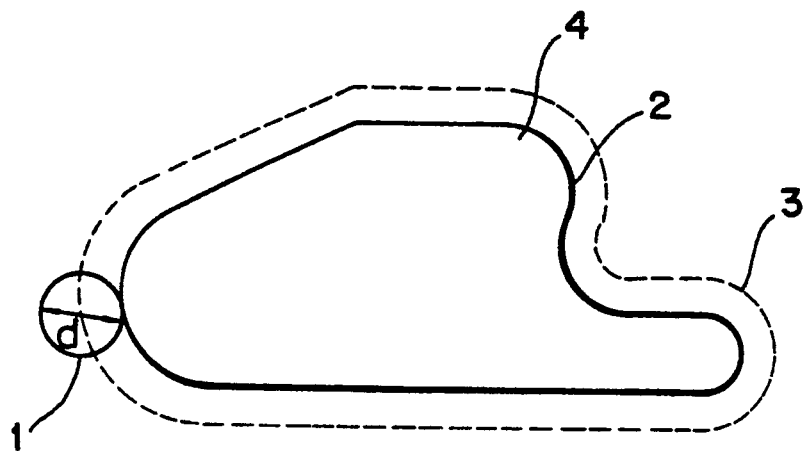
FIG. 1 is a diagram showing the route of a tool center point corrected in accordance with the diameter of the tool.
Figure 2:
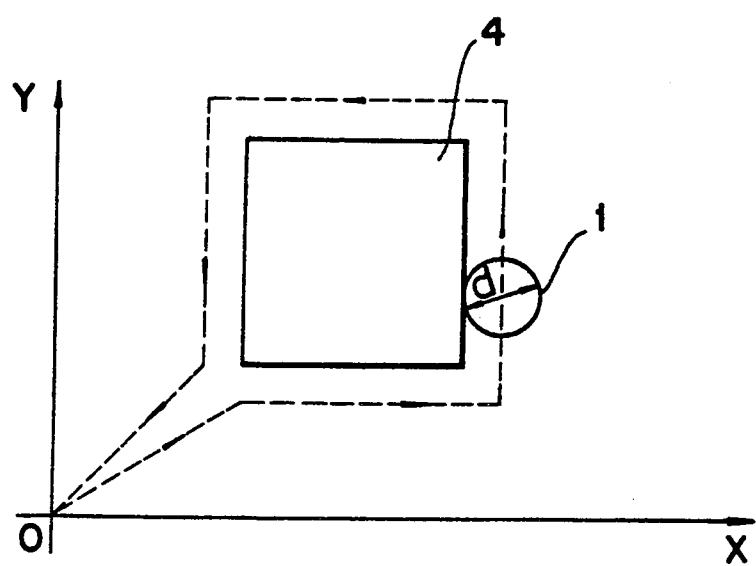
FIG. 2 is a diagram showing the route of a tool center point in accordance with a command for a left side correction.
Figure 3:
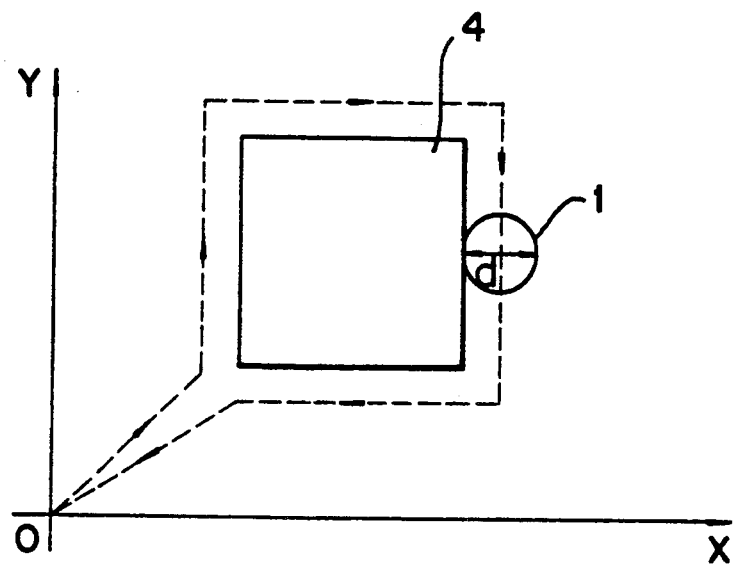
FIG. 3 is a diagram showing the route of the tool center point in accordance with a command for a right side correction.
Figure 4:
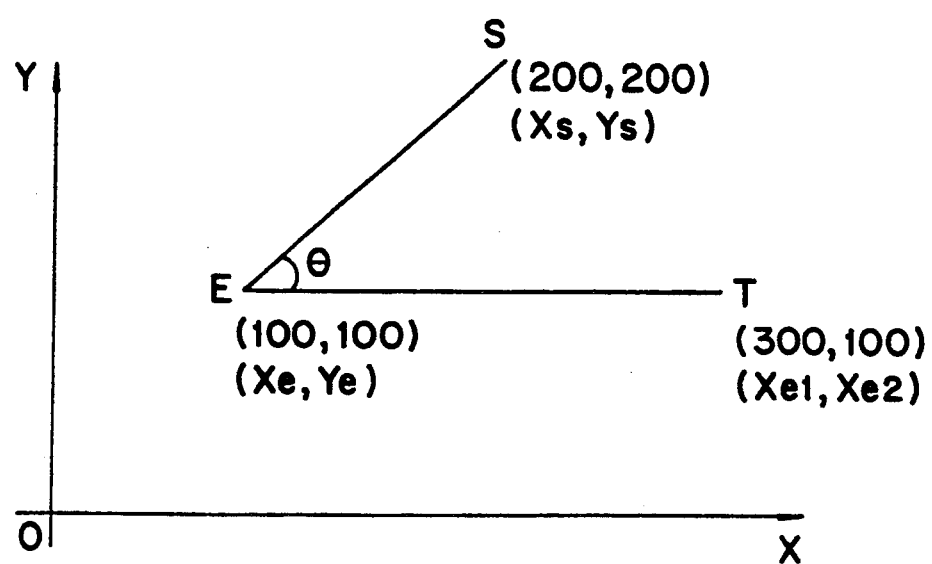
FIG. 4 is a diagram showing a programmed tool travel path when the diameter of the tool is zero.

In the G-code program, when the tool diameter is zero, the tool travels along the path shown by the solid line in FIG. 4. In practice, however, the travel path of the tool would be corrected according to the tool diameter because each tool has a definite diameter greater than zero.

Figure 5:
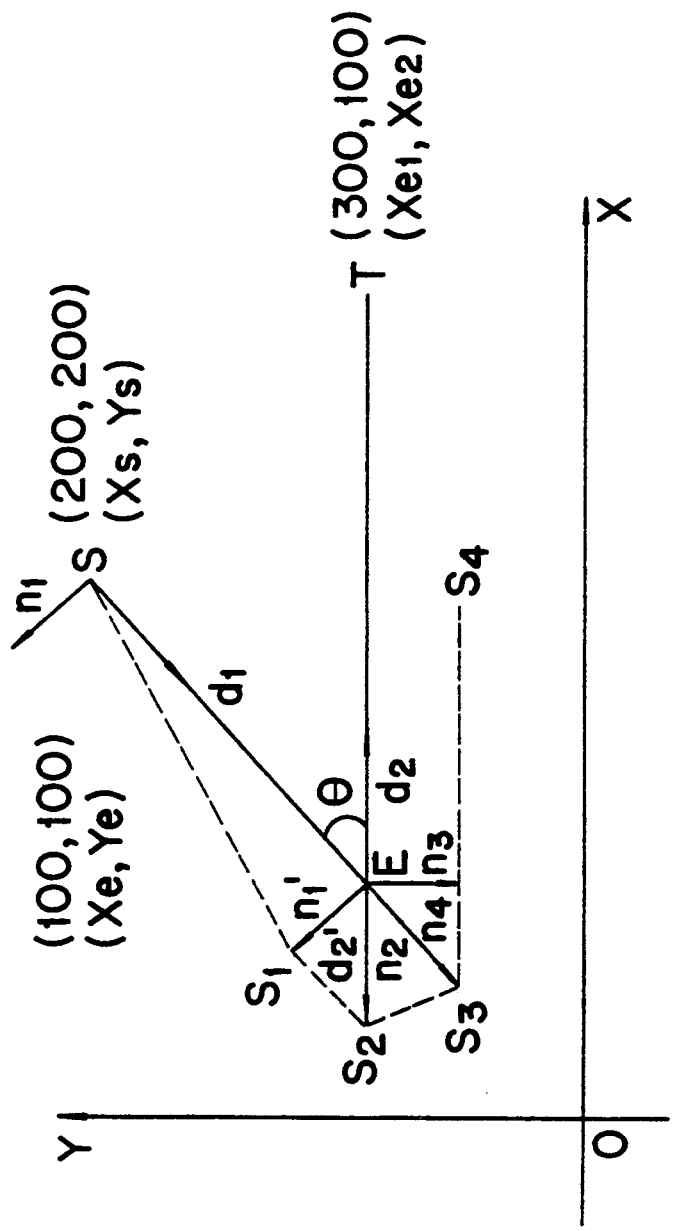
FIG. 5 is a diagram showing a tool travel path created according to the present invention when the diameter of the tool is not zero.
Figure 7A:
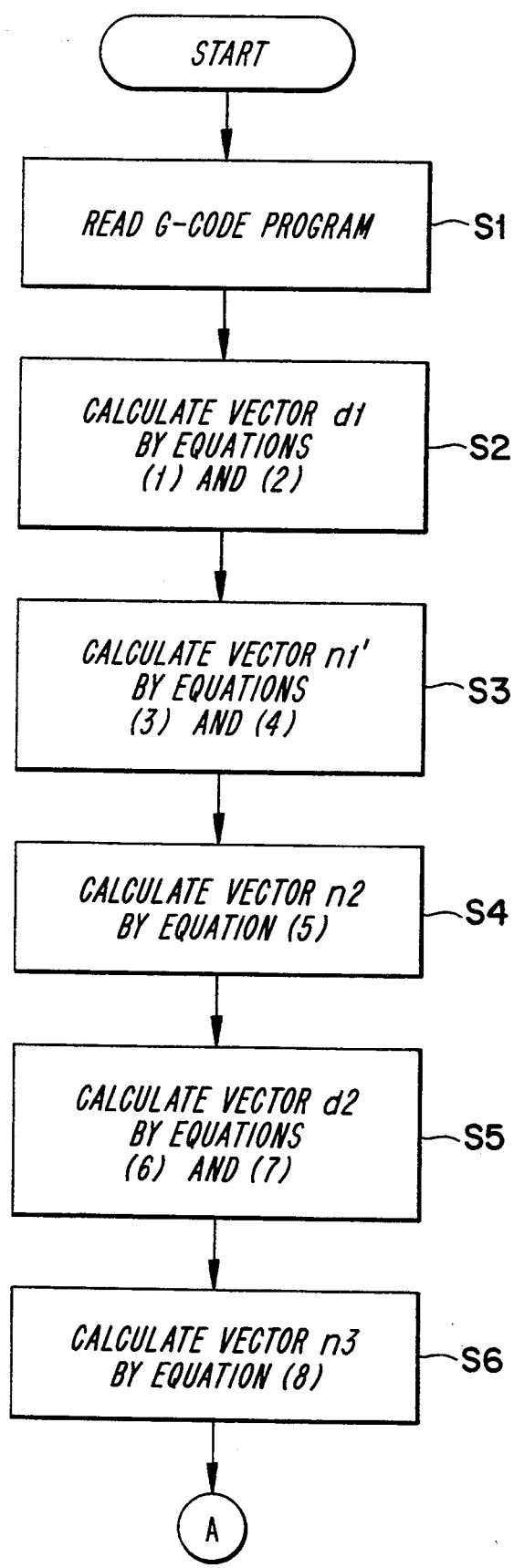

Referring to FIGS. 5 to 7, the first microprocessor 10 reads the blocks one by one in the G-code program at step S1, and then determines whether or not any tool correction command is included in the G-code program. If the tool correction command is included in the G-code program, the first microprocessor 10 again determines whether or not the interior angle $\theta$ between a first vector da, being a line segment from a starting point S of correction to a work starting point E and a second vector db, being a line segment from the work starting point E and the work ending point T, is acute.

Further, the first block of the G-code program contains a command which is indicative of the rapid movement of the tool from an unspecified point to the point S, the second block contains a command which is indicative of the rapid movement of the tool, with a radius of 10, from the point S to the point E by a left side correction, and the third block contains a command which is indicative of the movement of the tool from the point E to the point T by a straight line interpolation.

When the interior angle $\theta$ between the first and second vectors da and db is acute, a third vector n1' is calculated in steps S2 and S3. Prior to calculating the third vector n1', the first vector da may be calculated by the following equation (1).

$$daX = Xe - Xs \tag{1}$$
$$daY = Ye - Ys$$

where, the characters daX and daY represent components of the X and Y axes of the vector da respectively. In the step S2 an intermediary vector d1 is calculated by the following equation (2) utilizing the equation (1).

$$d1X = (daX*d)/\{(daX)^2 + (daY)^2\}^{\frac{1}{2}} \tag{2}$$
$$d1Y = (daY*d)/\{(daX)^2 + (daY)^2\}^{\frac{1}{2}}$$

where, d1X and d1Y represent components of the X and Y axes of the vector d1 respectively, and the character d represents the radius of the tool. According to the equation (2), it can be known that the intermediary vector d1 has the same direction as the first vector da and the same length as the radius of the tool.

An intermediary vector n1 is obtained by the following equation (3), which indicates that the vector n1 is made by rotating the vector d1 by 90 degrees in a clockwise direction, with the Z axis centered perpendicular to X-Y plane.

$$n1X = d1Y \tag{3}$$
$$n1Y = -d1X$$

where, n1X and n1Y represent respective components of the X and Y axes of the vector n1. Both the vectors d1 and n1 start from the origin of the coordinates.

Next, a third vector n1', which is made parallel by moving the vector n1 to the point E, may be obtained by the following equation (4).

$$n1X' = n1X + Xe \tag{4}$$

$$n1Y' = n1Y + Ye$$

where, $n1X'$ and $n1Y'$ represent components of the X and Y axes of the vector $n1'$ respectively.

In step S4, a fourth vector n2 is calculated by adding the vector d1 to the vector $n1'$.

$$n2X = n1X' + d1X \quad (5)$$

$$n2Y = n1Y' + d1Y$$

According to the equation (5), the length of the fourth vector n2 is $2^{\frac{1}{2}}$ times the radius of the tool.

A fifth vector n3 may be calculated by utilizing the vector d2 through step S5 and S6. Prior to calculating the fifth vector n3, the second vector db may be calculated by the following equation (6).

$$dbX = Xe1 - Xs \quad (6)$$

$$dbY = Ye1 - Ys$$

An intermediary vector d2 is then calculated by the following equation (7).

$$d2X = (dbX * d) / \{(dbX)^2 + (dbY)^2\}^{\frac{1}{2}} \quad (7)$$

$$d2Y = (dbY * d) / \{(dbX)^2 + (dbY)^2\}^{\frac{1}{2}}$$

The fifth vector n3 is then obtained by rotating the intermediary vector d2 by 90 degrees in a clockwise direction.

$$n3X = d2Y \quad (8)$$

$$n3Y = -d2X$$

According to the equations (7) and (8), the third vector n3 has the same length as the radius of the tool.

A sixth vector n4 may be obtained by utilizing the vectors d2 and n3 through steps S7 and S8.

Prior to calculating the sixth vector n4, an intermediary vector $d2'$, which has the direction opposite to that of the vector d2 and the same length as the vector d2, is calculated by the following equation (9).

$$d2X' = -d2X \quad (9)$$

$$d2Y' = -d2Y$$

The sixth vector n4 is then calculated by adding the vector n3 to the vector $d2'$ as expressed by the following equation (10).

$$n4X = n3X + d2X' \quad (10)$$

$$n4Y = n3Y + d2Y'$$

According to the equation (10), the length of the sixth vector n4 is $2^{\frac{1}{2}}$ times the radius of the tool.

Next, the vectors $n1'$, n2, n3 and n4 calculated in the aforementioned steps are provided to the second microprocessor 30 via the RAM 20 in step S9. In step 10, the second microprocessor 30 then drives the servo motor 60 so that the tool may travel along the end points of the third to sixth vectors in the manner of the straight line interpolation.

According to the method described above, the tool may be smoothly and precisely positioned at the work starting point.

As described above, the tool travel path creating method is described with an example wherein the G-code program contains a left side correction. However, the method is the same when the G-code program contains a right side correction, except that the third and sixth vectors $n1'$ and n3 are obtained by rotating the first and second vectors da and db by 90 degrees in a counter-clockwise direction.

We claim:

1. A tool travel path creating method for a control device, said method comprising the steps of:
   reading a G-code program;
   determining whether or not any correction command is included in the read G-code program;
   determining whether or not an interior angle between a first vector, from a starting point of correction to a work starting point, and a second vector, from the work starting point to a work ending point, is acute when any correction command is included in the read G-code program;
   if said interior angle is acute, creating a tool travel path to be corrected in accordance with the following steps:
      calculating and storing data for a third vector starting from the work starting point and with a direction perpendicular to said first vector and the same length as the radius of the tool;
      calculating and storing data for a fourth vector starting from the work starting point and formed by adding said second vector to an intermediary vector with the same direction as said second vector and the same length as the radius of the tool;
      calculating and storing data for a fifth vector starting from the work starting point and with a direction perpendicular to said second vector and the same length as the radius of the tool; and,
      calculating and storing data for a sixth vector starting from the work starting point and with the same direction as said first vector and a length of $2^{\frac{1}{2}}$ of the radius of the tool.

2. The tool travel path creating method according to claim 1, wherein the directions of said third and sixth vectors are obtained by rotating said first and second vectors respectively by 90 degrees in a clockwise direction when a right side correction is included in the G-code program, and the directions of said third and sixth vectors are respectively obtained by rotating said first and second vectors by 90 degrees in a counter-clockwise direction when a left side correction is included in the G-code program.

3. A method for controlling a travel path of a tool using a control device, said method comprising the steps of:
   reading a stored program;
   determining whether or not any correction command is included in the read program;
   determining whether or not an interior angle between a first vector, from a starting point of correction to a work starting point, and a second vector, from the work starting point to a work ending point, is acute when any correction command is included in the read program;

if said interior angle is acute, creating a tool travel path to be corrected in accordance with the following steps:

calculating and storing data for a third vector starting from the work starting point and with a direction perpendicular to said first vector and the same length as the radius of the tool and ending at an ending point;

calculating and storing data for a fourth vector starting from the work starting point and formed by adding said second vector to an intermediary vector with the same direction as said second vector and the same length as the radius of the tool and ending at an ending point;

calculating and storing data for a fifth vector starting from the work starting point and with a direction perpendicular to said second vector and the same length as the radius of the tool and ending at an ending point; and calculating and storing data for a sixth vector starting from the work starting point and with the same direction as said first vector and a length of $2^{\frac{1}{2}}$ of the radius of the tool and ending at an ending point; and driving a servo motor to cause the tool to travel along the end points of the third to sixth vectors.

4. The tool travel path creating method according to claim 3, wherein the directions of said third and sixth vectors are obtained by rotating said first and second vectors respectively by 90 degrees in a clockwise direction when a right side correction is included in the read program, and the directions of said third and sixth vectors are respectively obtained by rotating said first and second vectors by 90 degrees in a counter-clockwise direction when a left side correction is included in the read program.

5. A method for controlling a travel path of a tool using a numerical control device, said method comprising the steps of:

reading a stored control program;

determining whether or not a correction command is included in said read control program;

determining, responsive to a determination that a correction command is included, whether or not an interior angle between a first vector, extending from a starting point of correction to a work starting point, and a second vector, extending from the work starting point to a work ending point, is acute;

responsive to a determination that said interior angle is acute:

determining and storing a plurality of vectors each extending from the work starting point to a respective ending point along different predetermined directions;

creating a tool travel path to be corrected in accordance with said plurality of vectors; and driving a servo motor to cause the tool to travel successively along the ending points of said plurality of vectors.

6. The method according to claim 5, wherein said step of determining and storing said plurality of vectors comprises a step of determining and storing a third vector with a direction perpendicular to said first vector and having a length equal to a radius of the tool.

7. The method according to claim 5, wherein said step of determining and storing said plurality of vectors comprises a step of determining and storing a fourth vector formed by adding said second vector to an intermediary vector having the same direction as said second vector and a length equal to a radius of the tool.

8. The method according to claim 5, wherein said step of determining and storing said plurality of vectors comprises a step of determining and storing a fifth vector with a direction perpendicular to said second vector and having a length equal to a radius of the tool.

9. The method according to claim 5, wherein said step of determining and storing said plurality of vectors comprises a step of determining and storing a sixth vector with the same direction as said first vector and a length of $2^{\frac{1}{2}}$ of a radius of the tool.

10. The tool travel path creating method according to claim 5, wherein the directions of said third and sixth vectors are obtained by rotating said first and second vectors respectively by 90 degrees in a clockwise direction when a right side correction is included in the read program, and the directions of said third and sixth vectors are respectively obtained by rotating said first and second vectors by 90 degrees in a counter-clockwise direction when a left side correction is included in the read program.

* * * * *